United States Patent
Toft

(10) Patent No.: US 7,072,950 B2
(45) Date of Patent: Jul. 4, 2006

(54) METHOD AND APPARATUS FOR OPERATING SYSTEM AND APPLICATION SELECTION

(75) Inventor: Rolf Toft, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 930 days.

(21) Appl. No.: 09/767,333

(22) Filed: Jan. 23, 2001

(65) Prior Publication Data

US 2002/0138592 A1    Sep. 26, 2002

(51) Int. Cl.
G06F 15/16    (2006.01)
H04N 7/173    (2006.01)

(52) U.S. Cl. .......................................... 709/219; 725/86

(58) Field of Classification Search ................ 345/810, 345/845; 709/219, 213, 216, 223; 717/168, 717/172, 173, 178
See application file for complete search history.

(56) References Cited

U.S. PATENT DOCUMENTS

| | | | | |
|---|---|---|---|---|
| 5,548,645 A * | 8/1996 | Ananda | ...................... | 705/52 |
| 5,619,250 A * | 4/1997 | McClellan et al. | ......... | 725/132 |
| 5,666,293 A * | 9/1997 | Metz et al. | ................. | 709/220 |
| 5,974,547 A * | 10/1999 | Klimenko | ....................... | 713/2 |
| 5,978,855 A * | 11/1999 | Metz et al. | ................. | 709/249 |
| 6,006,034 A * | 12/1999 | Heath et al. | ................. | 717/170 |
| 6,141,683 A * | 10/2000 | Kraml et al. | ............... | 709/220 |
| 6,182,275 B1 * | 1/2001 | Beelitz et al. | .............. | 717/175 |
| 6,247,128 B1 * | 6/2001 | Fisher et al. | ................ | 713/100 |
| 6,430,596 B1 * | 8/2002 | Day, II | ....................... | 709/202 |
| 6,446,260 B1 * | 9/2002 | Wilde et al. | ................ | 717/173 |
| 6,457,122 B1 * | 9/2002 | Ramezani | ....................... | 713/1 |
| 6,487,723 B1 * | 11/2002 | MacInnis | .................... | 725/132 |
| 6,496,847 B1 * | 12/2002 | Bugnion et al. | .............. | 718/1 |
| 6,502,139 B1 * | 12/2002 | Birk et al. | ................... | 709/233 |
| 6,535,976 B1 * | 3/2003 | Hoggarth et al. | ............. | 713/2 |
| 6,539,473 B1 * | 3/2003 | Hubacher et al. | ............. | 713/2 |
| 6,651,080 B1 * | 11/2003 | Liang et al. | .................. | 718/1 |
| 6,751,658 B1 * | 6/2004 | Haun et al. | ................. | 709/222 |
| 6,795,912 B1 * | 9/2004 | Itoh et al. | ...................... | 713/2 |
| 6,801,813 B1 * | 10/2004 | Kay et al. | ..................... | 700/86 |
| 6,813,778 B1 * | 11/2004 | Poli et al. | ................... | 725/132 |
| 6,854,009 B1 * | 2/2005 | Hughes | ...................... | 709/220 |
| 2002/0046260 A1 * | 4/2002 | Day, II | ....................... | 709/219 |
| 2002/0157103 A1 * | 10/2002 | Song et al. | .................... | 725/97 |
| 2005/0228856 A1 * | 10/2005 | Swildens et al. | ........... | 709/200 |

* cited by examiner

*Primary Examiner*—David Wiley
(74) *Attorney, Agent, or Firm*—Miller Patent Services; Jerry A. Miller

(57) ABSTRACT

A Set Top Box or other client/server device including an Internet appliance which runs an application and operates under any of several operating systems. The Set Top Box boots from boot code stored, for example, in a ROM which permits a user to select an operating system and application. The Set Top Box contacts a Master Server and obtains a URL for download of the operating system and application. The URL is contacted and the application and operating system are downloaded. The Set Top Box operates under the operating system to run the application until another application is selected.

34 Claims, 5 Drawing Sheets

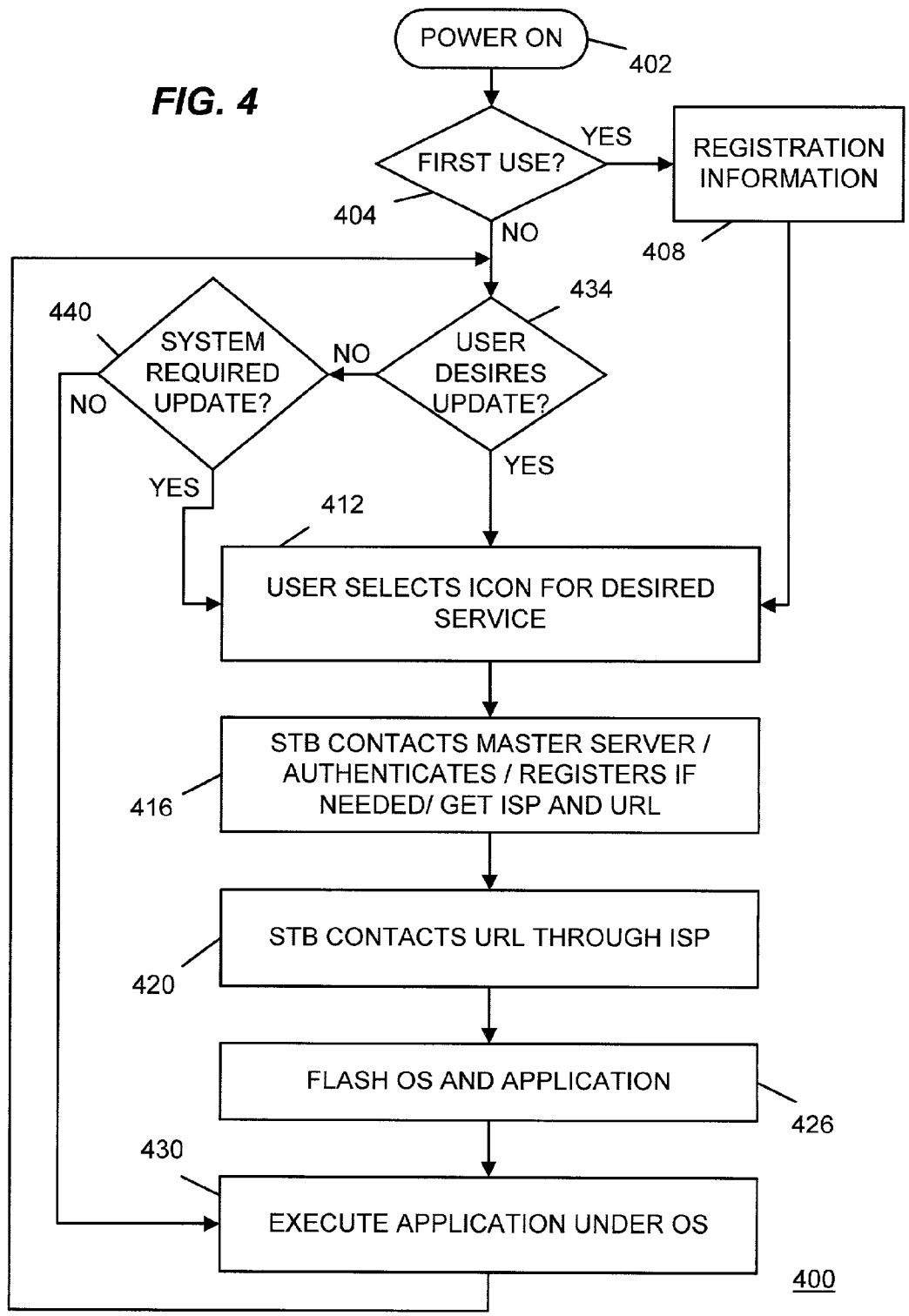

METHOD AND APPARATUS FOR OPERATING SYSTEM AND APPLICATION SELECTION

FIELD OF THE INVENTION

This invention relates generally to the field of download of operating systems and operating software. More particularly, certain embodiments of this invention relate to a simplified method and apparatus for selection of an application and associated operated system for download and execution in an interactive electronic device such as Set Top Boxes (STB) for television (e.g. satellite and cable applications) and Internet Appliances.

BACKGROUND OF THE INVENTION

Increasingly, consumer products such as satellite receivers, cable set top boxes and the like are including some sort of client/server functions such as full or limited Internet connectivity for interactive electronic programming guides (EPG), Web browsing, message exchange, E-mail and other services. With standards emerging and evolving, and multiple operating systems in use by different service providers, hardware is increasingly dependant upon software and firmware upgrades to continue to function and to provide continually enhanced functionality.

Even in the field of cable television Set Top Boxes, several different and generally incompatible standards have evolved with differing levels of functionality required by different cable systems. In order to meet the demands for manufacture of such Set Top Boxes, manufacturers must supply a different STB for each system with different firmware or software designed for that particular system.

As the availability of broadband communications expands, users will increasingly be able to make a choice from among various service providers for television programming and interactive services. Each such provider may have its own operating system (e.g. operating systems marked under the trademarks Windows™, Windows CE™, Linux™, VxWorks™, Aperios™, QNX™, etc.) and its own application software. To provide the user with the ability to select from among the various service providers, a simple to use, flexible hardware system which can operate under numerous operating systems to provide various applications would be desirable and advantageous over a requirement for separate hardware and/or software for each such provider. Such a system, to be successful, should be easy for the operator to use and upgrade. The present invention addresses these issues in a device which can be readily adapted to a new operating system and application in an easy to use, user transparent manner.

SUMMARY OF THE INVENTION

The present invention relates generally to a simplified method and apparatus for download and execution of an application and operating system. Objects, advantages and features of the invention will become apparent to those skilled in the art upon consideration of the following detailed description of the invention.

In one embodiment of the present invention embodied in a client device capable of operating using a plurality of operating systems on which a plurality of applications run, a method of downloading an operating system and an application which runs on the operating system includes providing a menu of selections representing a plurality of available applications including said application; receiving a signal representing a user's selection of a desired application; responsive to receiving the signal, connecting to a service provider; downloading the operating system associated with the desired application from the service provider; downloading the desired application; and executing the desired application.

In an exemplary embodiment of the present invention embodied in a television Set Top Box, includes a processor capable of running application software under a plurality of operating systems. A program provides code for: displaying an icon representing an application; responsive to the selection of the icon for initiating a download of an operating system associated with the application; initiating a download of the application software associated with the icon; and executing the application on the processor using the operating system.

A client device capable of running applications under a plurality of operating systems in accordance with an exemplary embodiment consistent with the present invention includes a central processor. A first memory stores boot code for booting the central processor into an operational state which presents a user with a choice of a plurality of operational environments. A modem, which downloads from a remote server an operating system associated with a selection by the user of an operating environment. The first memory, upon completion of the download, configures the client device to run under the operating system.

In another exemplary embodiment, a computer-readable medium tangibly embody instructions which, when executed by a computer, implement a process including: presenting a user with a selection of operating environments; receiving a user input selecting an operating environment; downloading an operating system corresponding to the operating environment; and loading and running the operating system.

The above summaries are intended to be exemplary embodiments of the invention which will be best understood in conjunction with the detailed description to follow and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 2, including

FIG. 4 is a flow chart of the exemplary system's operation as viewed by the user.

DETAILED DESCRIPTION OF THE INVENTION

Figure 1:
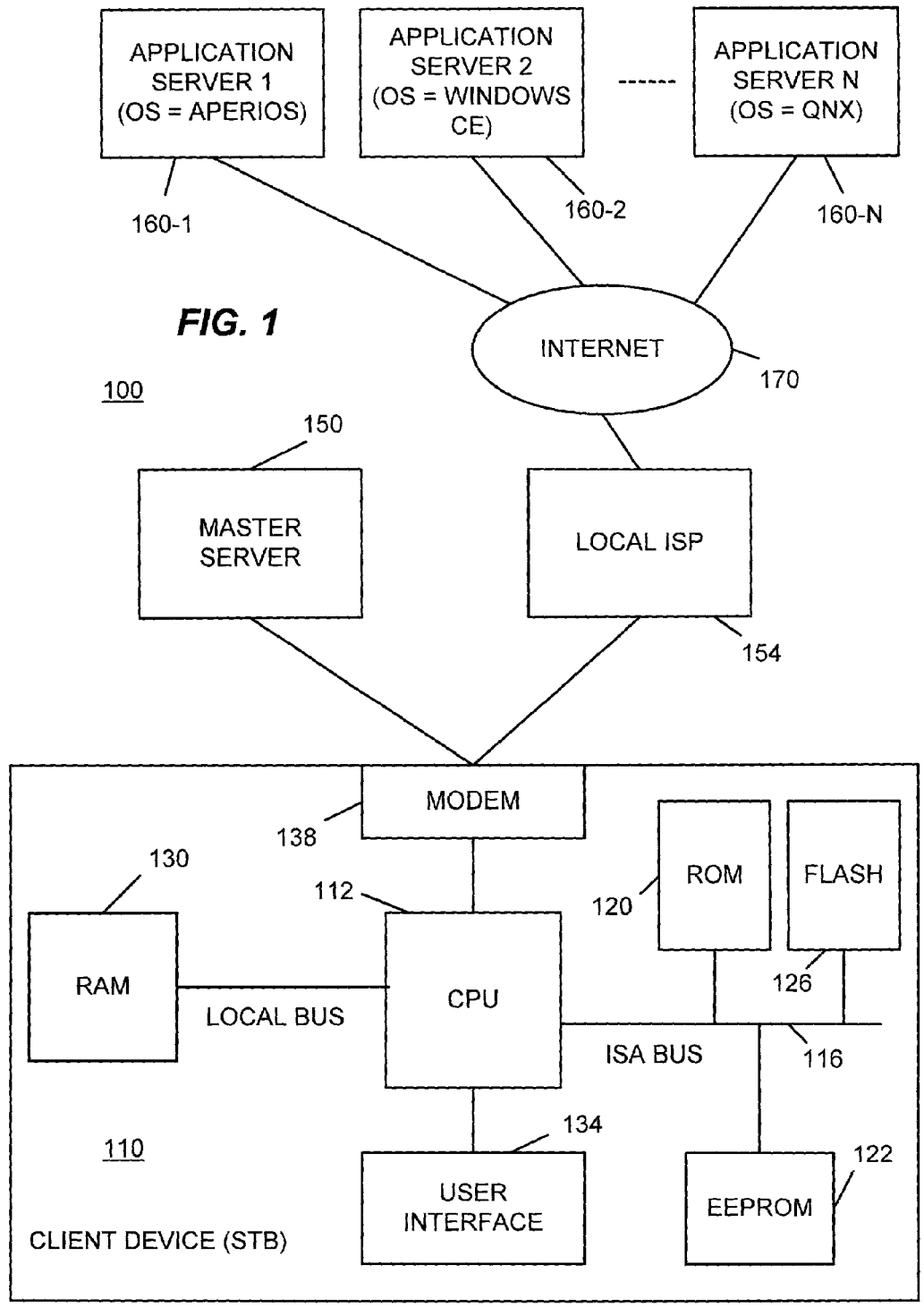
FIG. 1 is a diagram of an exemplary system in accordance with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, an exemplary system consistent with the present invention is illustrated as 100. In this system, a client device such as a Set Top Box 110 includes a central processing unit (CPU) 112 which is capable of operating under a plurality of operating systems. Such devices include the X86 family of microprocessors and compatibles such as those produced by Intel Corporation and ST Microelectronics. In the embodiment of FIG. 1, the central processor 112 is coupled via an ISA bus 116 to a Read Only Memory (ROM) 120, and Electrically Erasable Programmable Read Only Memory (EEPROM) 122 and a Flash Memory 126. CPU 112 is also coupled via a local bus to Random Access Memory (RAM) 130. CPU 112 is also coupled to a user interface 134 using any appropriate interconnection and to a modem 138 also using any appropriate interconnection.

TABLE 1 below describes generally the type of information stored in each of the memory devices connected to CPU 112. Of course, those skilled in the art will understand that the type of memory selection for each type of memory can be modified without departing from the present invention. In accordance with the present embodiment, the ROM 120 includes boot code which is used to boot up the central processor 112 at power up and also includes a decompression algorithm, a routine to control a download operation, various hardware and software checks and error checking for the code which will be downloaded into the Flash Memory. In addition, ROM 120 includes code for controlling a basic user interface and device drivers as required as will be understood by those skilled in the art. The EEPROM 122 stores a number of flags including flags which are set if the software codes stored in ROM 120 detects hardware or software errors as well as a flag which is set to indicate that an update is desired or required. The Flash Memory 122 is used to store downloaded operating system and application software while the RAM 130 is used in a more or less conventional manner as operating memory.

TABLE 1

| MEMORY | CONTENT |
|---|---|
| ROM | Boot code including decompression algorithm, download routine, hardware check, error check for downloaded flash code, user interface. |
| EEPROM | Error and update flags, hardware check log |
| Flash memory | Downloaded operating system and application software |
| RAM | Operating memory |

The ROM 120 is programmed to cause the CPU 112 to perform various functionality tests as well as to cause the client device 110 to dial via the modem 138 into a Master Server 150 to obtain basic services and to obtain access to various application servers for download of an operating system and application software. Upon dialing in to Master Server 150 and going through an authentication process, the client device 110 is programmed to dial a local Internet service provider (ISP) 154 and access one of a plurality of Application Servers 160-1, 160-2 through 160-N via the Internet 170. Upon dialing in to the selected Application Server through the local Internet service provider 154, the Application Server 160 downloads through the Internet 170 and the local Internet service provider 154, a selected operating system and application software. This software is loaded into Flash Memory 126 to become the default operating system of the client device 110 until such time as either an update or a change is desired or required. An exemplary process used for implementing the present invention as just briefly described is explained in greater detail with referenced FIG. 2.

Figure 2A:
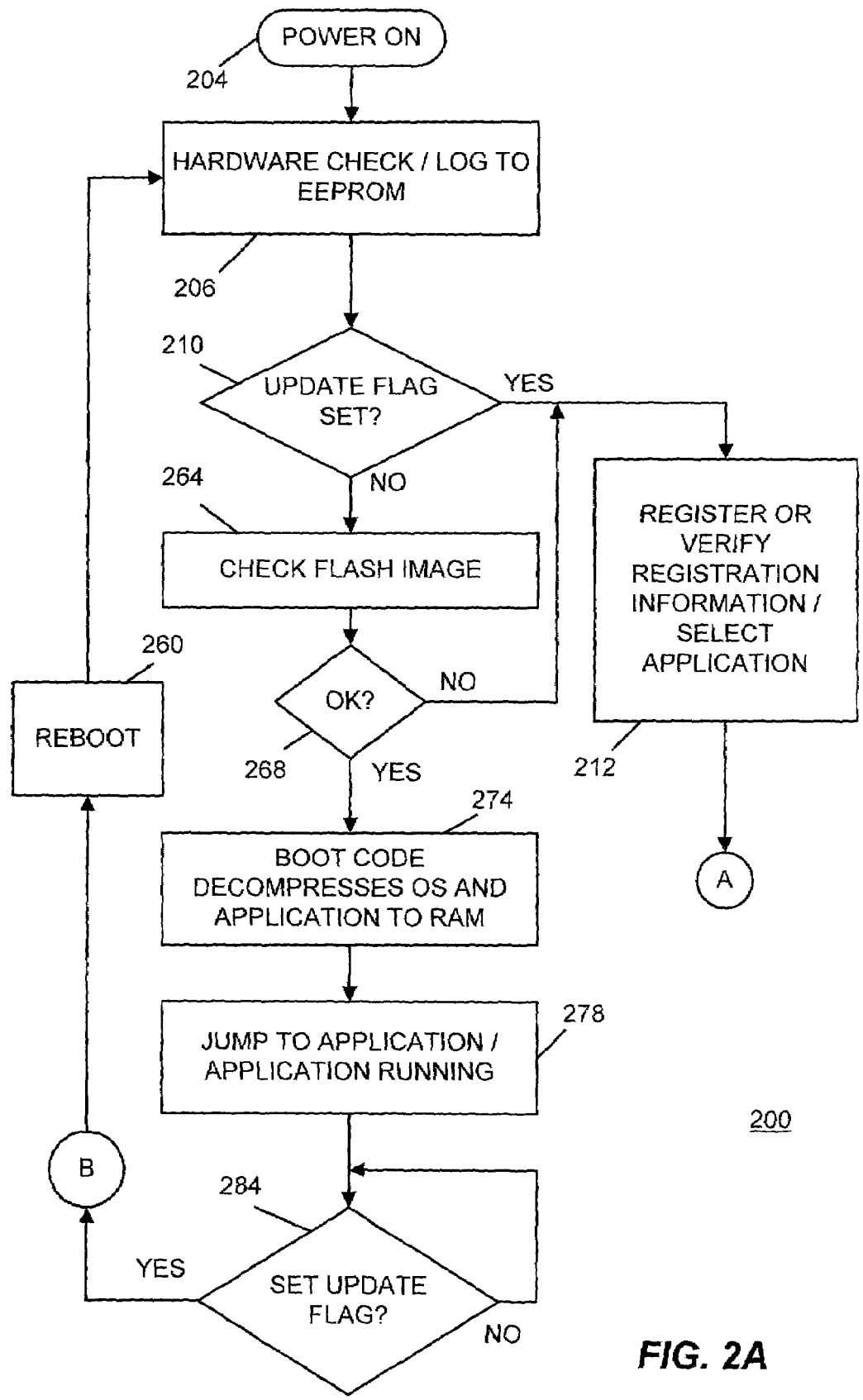
FIGS. 2A and 2B, is a flow chart of an overall process consistent with embodiments of the present invention.
Figure 2B:
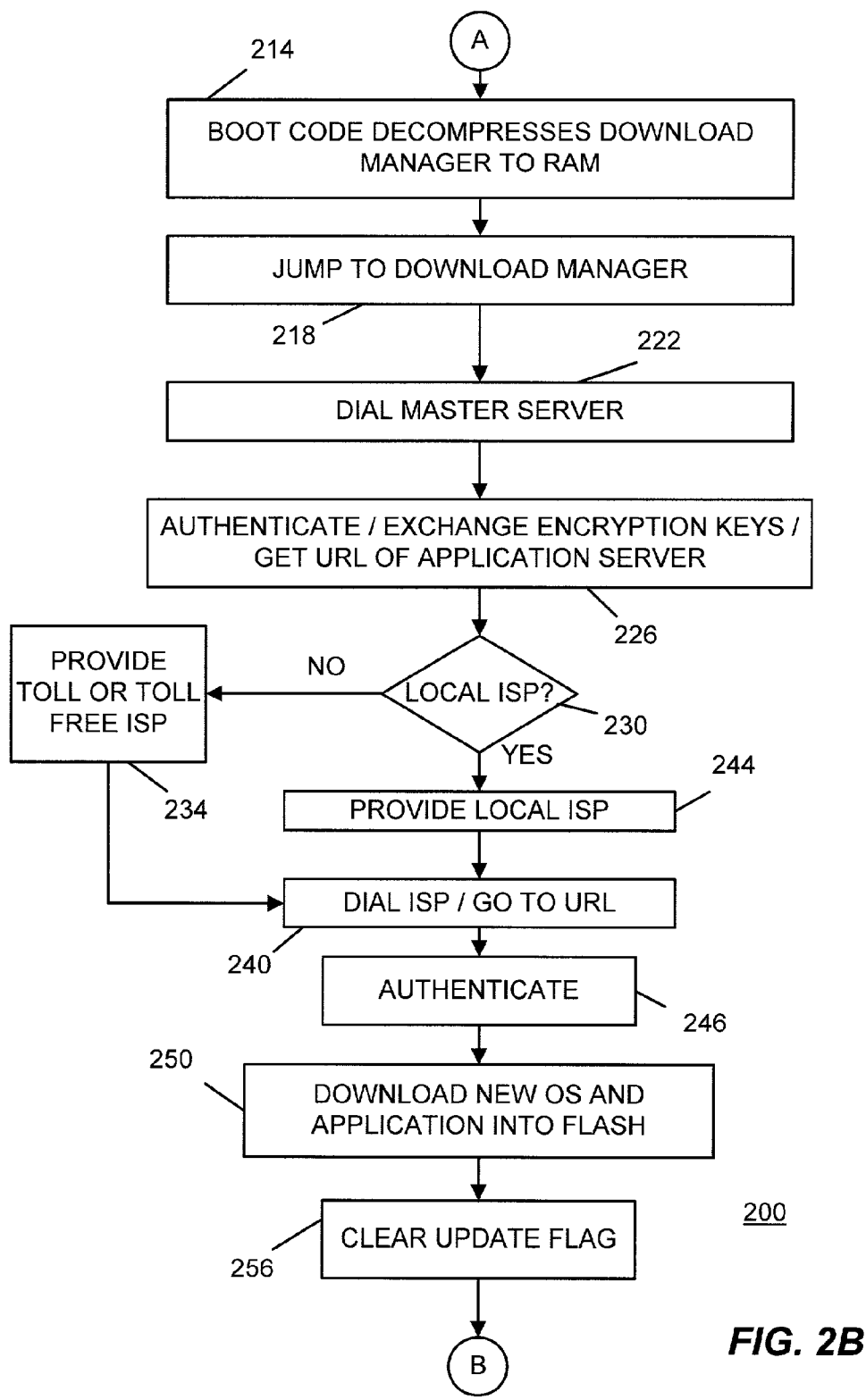

Referring now to FIG. 2A in conjunction with FIG. 2B, process 200 describes the operation of the client device 110. For purposes of the exemplary embodiment to follow, it is assumed that client device 110 is a Set Top Box, but this is not to be limiting since other client/server arrangements and Internet appliances could equally well utilize the present invention. Process 200 begins at 204 upon power on of the client device 110. Upon turning on the power, the CPU 112 boots using the code stored in ROM 120 and begins to perform a hardware check at 206 to determine that the hardware of client device 110 is operating properly. In the event it is not operating properly, various error reporting techniques are used to inform the user to go through a troubleshooting process or contact a service facility. These steps are not shown since they are not directly related to the present invention. The results of the hardware check are logged to the EEPROM 112 for non-volatile storage. The CPU 112, operating under control of the code in ROM 120, then inspects the EEPROM 122 at 210 to determine if an update flag is set. When received from the factory, the update flag will be set in order to drive a programming of Flash Memory 126 with a user selected operating system. If the update flag is set at 210, control passes to 212 where the user inputs registration information to register for the first time use. Such information may, for example, include owner's name, address, telephone number, etc.

The user then selects an application to run such as a cable network to which the STB 110 is to be attached or a service to be supplied through the STB 110. Control then passes to 214 where the CPU 112 is instructed by the boot code stored in ROM 120 to decompress a set of code referred to herein as a Download Manager and store that code to RAM 130. The processor then, again under instructions from ROM 120, jumps to the Download Manager 218 which controls the download process. The Download Manager instructs CPU 112 to dial the Master Server 150 via modem 138 at 222. Upon making a connection between modem 138 and Master Server 150 (preferably using a toll free connection) an authentication process is invoked wherein the client device 110 is authenticated using, for example, serial number and owner registration information entered through user interface 134 to determine the client device 110 is authorized to use the services of Master Server 150. This process takes place at 226 and, for the first time use preferably involves a registration process for a new owner or new user of a client device 110.

Once authentication is completed at 226 an exchange of encryption keys takes place to assure the security of the communication to follow. Next, a Universal Resource Locator (URL) of the desired application server (corresponding to the application selected by the user at 212, is provided to the STB 110 from the Master Server 150, and control passes to 230. If no local Internet service provider is available at 230 an alternative Internet service provider, using either a toll or a toll free call is provided at 234 and control passes to 240. If a local Internet service provider 154 does exist, the local Internet service provider 154's dial-in telephone number is provided to STB 110 at 244. Control then passes to 240 where the Internet service provider (e.g. 154) is dialed and the client device 110 instructs the ISP to go to the designated URL determined by the selection of application servers. When the application server 160 corresponding to the URL (which corresponds to the selected application) is reached, an authentication process again takes place at 246; and at 250 the operating system and application software are downloaded into Flash Memory 126. The update flag is then cleared at 256 and the system reboots at 260.

At the reboot, ROM 120's boot code again boots the CPU 112 and performs the hardware check and logs the results to EEPROM 122 at 206. Since the update flag has been cleared, it will not be set at 210 and the ROM 120 proceeds to direct CPU 112 to check the image stored in Flash Memory 126 at 264. If there is a problem with the checksum (or other error detection mechanism) for the image in Flash Memory, at 268 control passes back to 214 where the process of downloading the image corresponding to the selected application and operating system for the flash memory is repeated. However, if the image in Flash Memory checks okay at 268, the boot code in ROM 120 decompresses the operating system and application stored in Flash Memory 126 to RAM 130 at 274. ROM 120 then directs the CPU to jump to the application and run the application under the operating system at 278. The client device (STB) 110 generally continues to operate under the downloaded operating system running the downloaded application until such time as an event causes the update flag to be set again at 284 at which point a reboot is initiated at 260 and control returns to 206 as with the initial power up.

The process 200 which has just been described is preferably carried out in a manner which is very transparent to the user. In one embodiment, upon the initial power up of the client device, the user is presented with a screen asking for registration information such as name, address, telephone number, etc. Next, the user is presented with a screen asking for selection of an application. Upon selection of the application the user simply waits for the download process to complete at which time the client device 110 again boots up and the resulting boot up image seen by the user is the application selected by the user. Subsequently, when the user powers up or otherwise enables his client device 110, he is simply presented with the application running under the operating system which he initially selected until such time as either the system or the user determines that an update or a change in application is desired.

Figure 3:
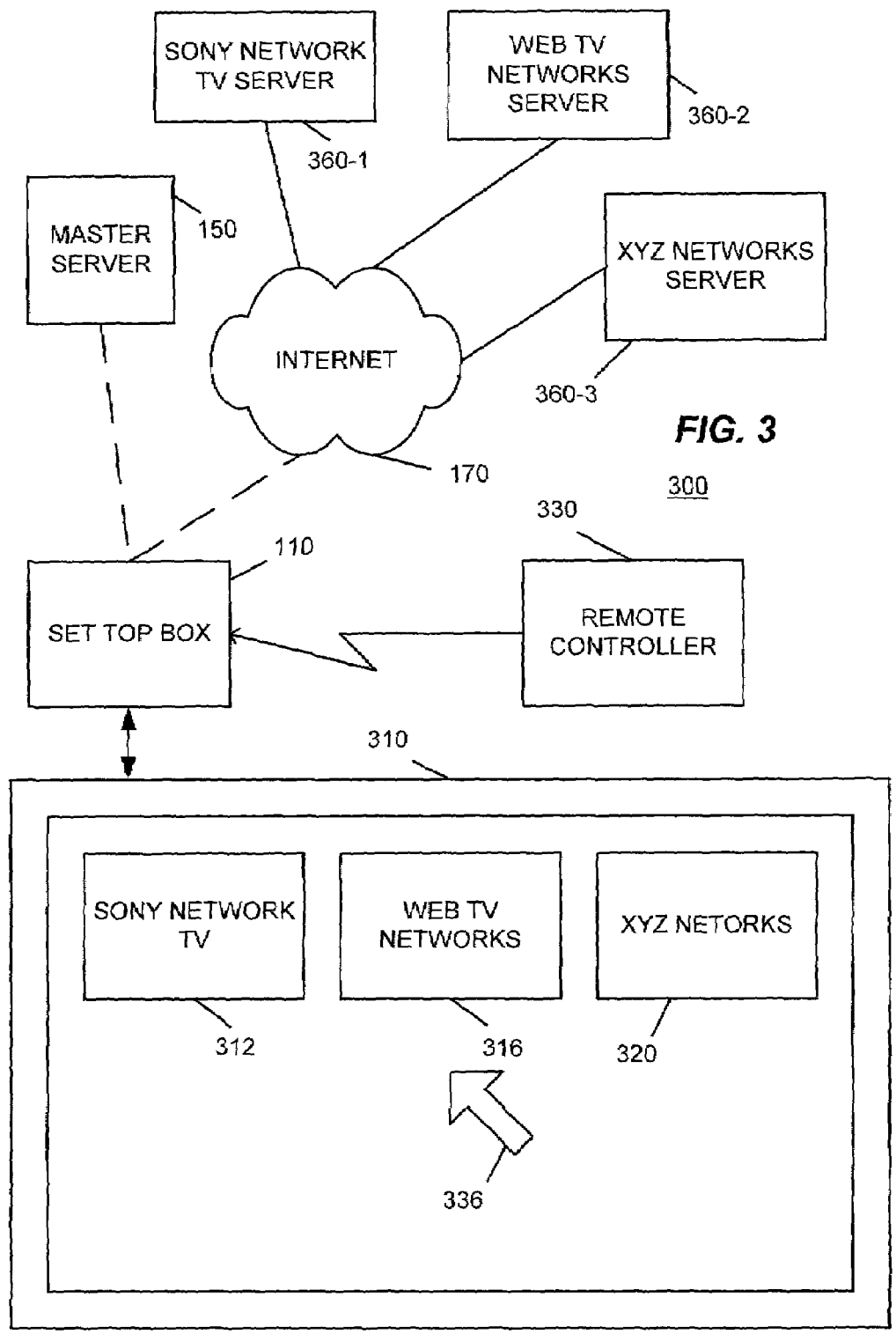
FIG. 3 illustrates the system's operation as viewed by the user.

FIG. 3 illustrates a Set Top Box embodiment of the current invention in a system 300 wherein after completing registration information or verifying the registration information, the user is presented with a television screen 310 showing, in this example, three possible choices of applications. The first application is to operate the Set Top Box device using an application called Sony Network TV 312. The second choice is to operate the Set Top Box 110 as a Web TV Networks Device 316 and the third choice is to operate the Set Top Box 110 as an XYZ Networks Device illustrated as icon 320. The user's screen is provided with icons or other menu selections such as 312, 316 and 320 which the user can select using a remote controller 330 to move a cursor or other indicator 336 to the appropriate selection.

Once the selection has been made, the Set Top Box 110, in a manner transparent or near transparent to the user, initially dials the Master Server 150 in the manner previously described, obtains a URL and an ISP telephone number from the Master Server 150. Using this information the Set Top Box communicates through the Internet to one of three servers: 360-1, 360-2 or 360-3 which serve as Application Servers for Sony network TV, Web TV Networks or XYZ Networks respectively. The Set Top Box 110 then downloads the operating system and the appropriate application to permit the Set Top Box 110 to operate in the mode selected by the user. The Set Top Box 110 then re-boots into the application selected by the user. This process is illustrated in FIG. 4 as process 400.

At power-on 402, the Set Top Box 110 determines that this is the first use (by presence or absence of registration information) at 404. If it is the first use at 404, registration information is collected from the user at 408 and control passes to 412 where the user selects an icon or other menu selection for the desired service. The Set Top Box 110 then contacts the Master Server at 416, authenticates, registers the user and obtains an ISP telephone number and a URL corresponding to the selected application. At 420 the Set Top Box 110 contacts the URL through the ISP provided by the Master Server 150 and at 426 the operating system and application associated with the URL and the selection made by the user at 412 is flashed into the Flash Memory at 426. At 430, the application loads and operates under the operating system. Control then passes to 434 until such time as the user desires an update of the application or operating system which directs controlled 412. If no update is desired at 434 and if the system has not determined in some other way (for example by a message coming in from the network) at 440 then the Set Top Box 110 continues to operate under the operating system and application at 430. If either the user desires to update or change the operating system or the system requires an update, control passes to 412 where the user is again presented with the opportunity to select a service to be updated.

Those skilled in the art will appreciate that although the example given is primarily directed to use of a Set Top Box in a television environment such as a cable TV system, many other applications are possible for this technology. This invention can be applied to Internet appliances as well as most any other client server system in which multiple operating systems need to be accommodated. In the embodiment described, the user essentially chooses both an application and an operating system with a single click of an icon and although the underlying operating system may even be unknown to the user, by selection of an application (a television or Internet network in this example) the operating system required to support the application is implicitly selected and the device operating under control of the ROM 130 downloads the appropriate operating system and application in a manner transparent to the user but simple to understand.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

The memory structure described above uses a ROM 120 to store boot code and a flash memory 126 to store the operating system and application. However, those skilled in the art will recognize that other storage technologies including magnetic, optical and magneto-optical disc drive technologies could also be used in variations of the invention without departing from the present invention. Such variations are considered equivalents.

The present invention is preferably implemented using a programmed processor executing programming instructions that are broadly described above in flow chart form. Instructions for carrying out processes of the invention can be stored in any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

The invention claimed is:

1. On a client device capable of operating using a plurality of operating systems on which a plurality of applications run, a method of downloading an operating system and an application which runs on the operating system, comprising:
   a boot code of the client device providing a menu of selections representing a plurality of available applications including said application, wherein the boot code is incapable of running said application;
   receiving a signal representing a user's selection of said application;
   responsive to receiving the signal, the boot code activating a download manager of the client device;
   the download manager managing a download of the operating system associated with the application and the application in a manner transparent to the user with no input from the user, further comprising:
   connecting to a service provider;
   downloading the operating system associated with the application from the service provider, wherein the operating system associated with the application is not already installed on the client device at a time of the downloading;
   downloading the application; and
   installing and executing the operating system and the application.

2. The method of claim 1, wherein the application comprises an entertainment network service application.

3. The method of claim 1, wherein the connecting comprises:
   connecting to a Master Server;
   obtaining a URL from the Master Server; and
   connecting to the URL via the service provider.

4. The method of claim 3, further comprising authenticating the client device at the Master Server.

5. The method of claim 1, wherein the connecting comprises:
   connecting to a Master Server;
   obtaining a URL from the Master Server;
   obtaining a telephone number for a service provider from the Master Server; and
   connecting to the URL via the service provider by dialing the telephone number provided by the Master Server.

6. The method of claim 5, further comprising authenticating the client device at the Master Server.

7. The method of claim 1, wherein the downloading stages comprise downloading to a flash memory element.

8. The method of claim 1, wherein the downloading stages comprise downloading a compressed image of the operating system and application.

9. The method of claim 1, further comprising decompressing the operating system and the application prior to the executing stage.

10. A Set Top Box, comprising in combination:
    a processor capable of running a plurality of application programs under a plurality of operating systems; and
    program means comprising:
    a boot code displaying an icon representing an application;
    responsive to the selection of the icon representing a selected one of the plurality of application programs, a download manager initiating a download of an operating system associated with the selected application program, wherein the selected application program is incapable of running on the boot code, and wherein the operating system associated with the selected application program is not already installed on the set top box at a time of initiating the download;
    the download manager initiating a download of the application software associated with the icon; and
    installing and executing the application on the processor using the operating system.

11. The Set Top Box of claim 10, wherein the program means is stored in a non-volatile memory.

12. The Set Top Box of claim 11, wherein the non-volatile memory comprises a Read Only Memory.

13. The Set Top Box of claim 10, wherein the program means further comprises means for collecting registration information from a user.

14. The Set Top Box of claim 10, wherein the program means further comprises means for exchanging authentication information with a Master Server.

15. The Set Top Box of claim 10, wherein the program means for initiating a download further comprises means for initiating a download by:
    connecting to a Master Server;
    obtaining a URL from the Master Server; and
    connecting to the URL via the service provider.

16. The Set Top Box of claim 10, wherein the program means for initiating a download further comprises means for initiating a download by:
    connecting to a Master Server;
    obtaining a URL from the Master Server;
    obtaining a telephone number for a service provider from the Master Server; and
    connecting to the URL via the service provider by dialing the telephone number provided by the Master Server.

17. The Set Top Box of claim 10, wherein the program means further comprises means for decompressing the operating system and the application before executing the application on the processor using the operating system.

18. A client device capable of running applications under a plurality of operating systems, comprising:
    a central processor;
    a first memory storing boot code for booting the central processor into an operational state which presents a user with a choice of application programs, each of which operates under one of a corresponding plurality of associated operating systems;

a modem, which downloads under control of a download manager of the client device from a remote server an operating system associated with a selection by the user of one of said application programs, wherein the operating system being downloaded is transparent to the user, since the user selected an application rather than an operating system;

wherein, the boot code is incapable of running the one of the said application programs, and wherein the operating system associated with the selection by the user of the one of said application programs is not already installed on the client device at a time of the download; and wherein the first memory, upon completion of the download, configures the client device to run the selected application under the operating system.

19. The client device of claim 18, wherein the first memory comprises a non-volatile memory element.

20. The client device of claim 18, wherein the first memory comprises a Read Only Memory.

21. The client device of claim 18, wherein the boot code further comprises code for collecting registration information from a user.

22. The client device of claim 18, wherein the boot code further comprises code for exchanging authentication information with the remote server.

23. The client device of claim 18, wherein the boot code further comprises code for initiating the download by the modem by:

first connecting to a Master Server;

obtaining a URL from the Master Server corresponding to the remote server; and connecting to the URL via an Internet service provider.

24. The client device of claim 18, wherein the boot code further comprises code for initiating the download by the modem by:

first connecting to a Master Server;

obtaining a URL from the Master Server corresponding to the remote server;

obtaining a telephone number for a service provider from the Master Server; and connecting to the URL via the service provider by dialing the telephone number provided by the Master Server.

25. The client device of claim 18, wherein the boot code further comprises code for decompressing the operating system.

26. A computer-readable medium tangibly embodying instructions which, when executed by a computer, implement a process comprising:

a boot code presenting a user with a selection application programs that operate on a plurality of associated operating systems, with each application program being associated with an associated operating system;

receiving a user input selecting an application program, wherein the boot code is incapable of running the selected application program;

responsive to receiving the user input, the boot code activating a download manager;

the download manager managing a download operation in a manner transparent to a user with no input from the user further comprising:

downloading an operating system corresponding to the selected application program, wherein the operating system corresponding to the selected application program is not already installed on the client device at a time of the download; and loading and running the operating system.

27. The computer-readable medium of claim 26 embodied in a non-volatile memory.

28. The computer-readable medium of claim 26 embodied in a Read Only Memory element.

29. The computer-readable medium of claim 26, wherein the instructions instruct the operating system to be loaded to memory location corresponding to a flash memory element.

30. The computer-readable medium of claim 26, wherein the operational environment comprises an entertainment network service application operating environment.

31. The computer-readable medium of claim 26, wherein the downloading comprises:

connecting to a Master Server;

obtaining a URL from the Master Server; and connecting to the URL via a service provider.

32. The computer-readable medium of claim 26, wherein the downloading further comprises authenticating the client device at the Master Server.

33. The computer-readable medium of claim 26, wherein the downloading further comprises:

connecting to a Master Server;

obtaining a URL from the Master Server;

obtaining a telephone number for a service provider from the Master Server; and connecting to the URL via the service provider by dialing the telephone number provided by the Master Server.

34. The computer-readable medium of claim 26, wherein the downloading further comprises downloading a compressed image of the operating system and an application.

* * * * *